United States Patent
Bhatt et al.

(10) Patent No.: US 10,496,329 B2
(45) Date of Patent: Dec. 3, 2019

(54) METHODS AND APPARATUS FOR A UNIFIED BASEBAND ARCHITECTURE

(71) Applicant: Cavium, LLC, Santa Clara, CA (US)

(72) Inventors: Tejas M. Bhatt, Sunnyvale, CA (US); Gregg A. Bouchard, Georgetown, TX (US); Hong Jik Kim, San Jose, CA (US); Jason D. Zebchuk, Watertown, MA (US); Ahmed Shahid, San Jose, CA (US)

(73) Assignee: Cavium, LLC, Santa Clara, CA (US)

( * ) Notice: Subject to any disclaimer, the term of this patent is extended or adjusted under 35 U.S.C. 154(b) by 0 days.

(21) Appl. No.: 15/594,497

(22) Filed: Jun. 2, 2017

(65) Prior Publication Data
US 2018/0352557 A1    Dec. 6, 2018

(51) Int. Cl.
| | | |
|---|---|---|
| *G06F 3/06* | (2006.01) | |
| *G06F 9/50* | (2006.01) | |
| *H04L 12/24* | (2006.01) | |
| *H04W 88/08* | (2009.01) | |
| *G06F 9/46* | (2006.01) | |

(52) U.S. Cl.
CPC .......... *G06F 3/0659* (2013.01); *G06F 9/5077* (2013.01); *G06F 9/46* (2013.01); *H04L 41/0823* (2013.01); *H04W 88/085* (2013.01)

(58) Field of Classification Search
CPC .......... G06F 12/00; G06F 12/14; H04B 1/66; H04L 47/6225
See application file for complete search history.

(56) References Cited

U.S. PATENT DOCUMENTS

| | | | | |
|---|---|---|---|---|
| 7,593,997 B2 * | 9/2009 | Dropps | ................. | G06F 3/0605 370/374 |
| 2002/0010891 A1 * | 1/2002 | Klein | ................. | G06F 11/1008 714/767 |
| 2003/0103564 A1 * | 6/2003 | Hanaki | ................. | H04N 19/51 375/240.03 |
| 2006/0098648 A1 * | 5/2006 | Fukunaga | ........... | H04L 47/6215 370/389 |
| 2008/0215825 A1 * | 9/2008 | Min | ..................... | G06F 12/0284 711/148 |
| 2010/0095186 A1 * | 4/2010 | Weingarten | ......... | G06F 11/1072 714/763 |
| 2011/0225589 A1 * | 9/2011 | Pirog | .................... | G06F 9/3851 718/102 |
| 2014/0317636 A1 * | 10/2014 | Mattheis | ................... | G06F 9/46 718/106 |
| 2015/0055659 A1 * | 2/2015 | Testicioglu | ......... | H04L 47/6225 370/412 |

* cited by examiner

*Primary Examiner* — Getente A Yimer
(74) *Attorney, Agent, or Firm* — James M. Wu; JW Law Group

(57) ABSTRACT

Methods and apparatus for a unified baseband architecture. In an exemplary embodiment, an apparatus includes a shared memory having a plurality of access ports and a scheduler that outputs scheduled jobs. Each scheduled job identifies data processing to be performed. The apparatus also includes a plurality of functional elements coupled to the plurality of access ports, respectively, to access the shared memory. Each functional element is operable to retrieve selected data from the shared memory, process the selected data to generate processed data, and store the processed data into the shared memory based on a received scheduled job.

19 Claims, 9 Drawing Sheets

METHODS AND APPARATUS FOR A UNIFIED BASEBAND ARCHITECTURE

FIELD

The exemplary embodiments of the present invention relate to the operation of communications networks. More specifically, the exemplary embodiments of the present invention relate to methods and apparatus for processing data in a communication system.

BACKGROUND

With the rapidly growing trend of mobile and remote data access over high-speed communication networks, such as 3G, 4G, or LTE cellular services, accurately delivering data has become increasingly challenging and difficult. A high-speed communication network that is capable of delivering information includes, but is not limited to, a wireless network, a cellular network, wireless personal area network ("WPAN"), wireless local area network ("WLAN"), wireless metropolitan area network ("MAN"), or the like. These networks typically utilize different transmission or network protocols based on industry standards for each protocol.

Currently, well defined baseband processing is used to implement each protocol across multiple chips or devices, which can include field programmable gate arrays (FPGA), application specific integrated circuits (ASIC), and digital signal processors (DSP). For example, in a transmitting device, data to be transmitted flows through specific pipelined stages implemented using multiple devices to generate a transmit signal that can be transmitted over the air (OTA). The devices of the pipelined stages provide specific functions, such as rate matching, encoding, and modulation. The functions of the pipelined stages can be reversed (demodulation, decoding, and rate dematching) in another set of devices to process received signals and convert these signals back to the original data.

However, conventional baseband systems have several limitations in that the existing pipelined stages implemented by the configured set of devices may not be suitable to process signals based on a particular protocol or standard. Thus, the pipelined stages may need to be changed or modified for each type of signal and/or protocol that is to be used. Unfortunately, changing current baseband systems implemented with multiple devices (e.g., FPGA and DSP devices) to process different protocols may require significant effort to redesign the architecture and associated hardware and software interfaces. Such changes may not even be possible once these baseband systems are in use out in the field. Furthermore, the alarming rate of evolving radio standards, the constant demand for new features, and short development time have made the limitations of conventional baseband systems even more apparent.

Therefore, it would be desirable to have a unified baseband architecture that provides for programmable pipeline processing thereby allowing a wide range of baseband functions to be performed to support different transmission formats and protocols utilized by evolving radio standards.

SUMMARY

In various exemplary embodiments, methods and apparatus are provided for a unified baseband architecture. The architecture comprises a CPU subsystem that is able to process both Layer 1 as well as Layers 2-7 (packet & application layer) functions of the OSI reference model using integrated DSPs, hardware functional elements (FE), general purpose CPUs and packetized I/O interfaces to provide a wide range of baseband functions in a highly programmable architecture.

In various exemplary embodiments, the architecture is configurable to support multiple radio protocols across multiple mobile technology generations (3G, 4G, (LTE-A) and beyond). In an exemplary embodiment, an integrated baseband processor comprises programmable functional elements to perform digital signal processing functions, highly configurable hardware functional elements to perform basic fixed radio functions (e.g., FFT, error correction, channel decoding), and general purpose CPU resources for packet processing.

In an exemplary embodiment, an apparatus is provided that includes a shared memory having a plurality of access ports and a scheduler that outputs scheduled jobs. Each scheduled job identifies data processing to be performed. The apparatus also includes a plurality of functional elements coupled to the plurality of access ports, respectively, to access the shared memory. Each functional element is operable to retrieve selected data from the shared memory, process the selected data to generate processed data, and store the processed data into the shared memory based on a received scheduled job.

In an exemplary embodiment, a method is provided that includes operations of receiving a plurality of scheduled jobs at a plurality of functional elements, and reading data from a shared memory, wherein the reading is performed by the plurality of functional elements. The method also includes an operation of processing the data to generate processed data, wherein each functional element processes the data it has read from the shared memory based on a scheduled job it has received. The method also includes an operation of writing the processed data to the shared memory, wherein each functional element writes the processed data it has generated.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which should not be taken to limit the invention to the specific embodiments, but are for explanation and understanding only.

DETAILED DESCRIPTION

Figure 1:
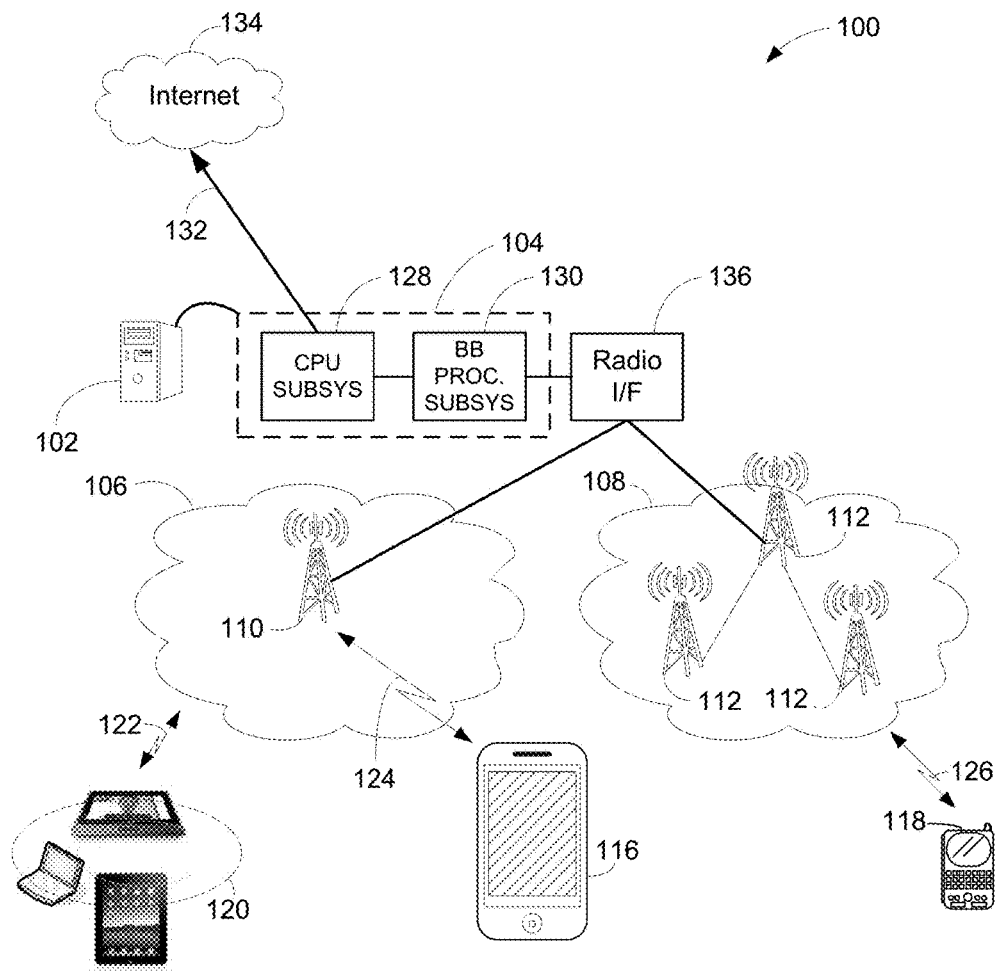
FIG. 1 shows an exemplary block diagram illustrating a communications network having a base station that includes a novel integrated baseband processor constructed in accordance with exemplary embodiments of the present invention.

The purpose of the following detailed description is to provide an understanding of one or more embodiments of the present invention. Those of ordinary skill in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming, but would nevertheless be a routine undertaking of engineering for those of ordinary skill in the art having the benefit of the embodiment(s) of this disclosure.

Various exemplary embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB ("eNodeB"), computer and/or communication devices or mechanisms, or combinations of components thereof. The term "computer" includes a processor, memory, and buses capable of executing instructions wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 shows an exemplary block diagram illustrating a communications network 100 having a base station 102 that includes a novel integrated baseband processor 104 constructed in accordance with exemplary embodiments of the present invention. Network 100 includes two cell sites 106 and 108 and can be configured as a third generation ("3G"), 4G, LTE, or 5G network configuration or other type of wireless network configuration.

Cell sites 106 and 108 include radio towers 110 and 112. Radio towers 110 and 112 are further coupled to various user equipment (UE) devices, such as a tablets and/or iPad® 120, cellular phone 116, and handheld device 118, via wireless communications links 122, 124, and 126. Cell site 106 facilitates network communication between mobile devices such as UEs 120 and 116 and the base station 102 via radio tower 110 and cell site 108 facilitates network communication between UE 118 and the base station 102 via radio tower 112. It should be noted that the cell sites 106 and 108 can include additional radio towers as well as other land switching circuitry.

The base station 102 includes an exemplary embodiment of an integrated baseband processor 104. The processor 104 is configurable to support multiple radio protocols across multiple mobile technology generations (3G, 4G, (LTE-A) and beyond). In an exemplary embodiment, the integrated baseband processor comprises a CPU subsystem 128 having general purpose CPU resources for packet processing and a baseband processing subsystem 130 having programmable functional elements for digital signal processing and configurable hardware functional elements to perform basic fixed radio functions (e.g., FFT, error correction, and channel decoding).

An advantage of using the integrated baseband processor 104 is to improve efficiency of simultaneous processing of different RF signals received from different antennas or towers at different sectors. For example, assuming the tablets or iPad® 120 use a first type of RF signals to communicate with radio tower 110 at cell site 106 and portable device 118 uses a second type of RF signals to communicate with radio tower 112 at cell site 108. After receiving the first and second types of RF signals, the integrated baseband processor 104 is able to process both RF signals substantially concurrently. A more detailed description of the integrated baseband processor 104 is provided below.

Figure 2A:
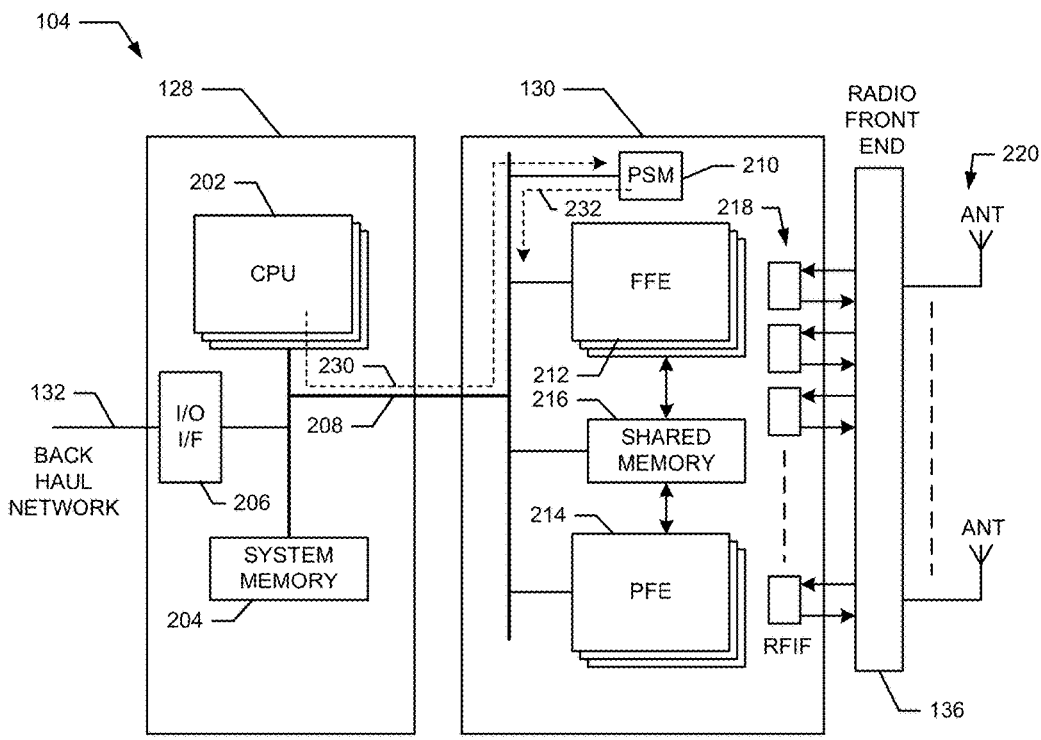
FIG. 2A shows a detailed exemplary embodiment of the novel integrated baseband processor illustrated in FIG. 1.

FIG. 2A shows a detailed exemplary embodiment of the novel integrated baseband processor 104 shown in FIG. 1. The integrated baseband processor 104 includes two primary subsystems, namely the CPU subsystem 128 and the baseband processing subsystem 130. The two subsystems are inter-connected over one or more high bandwidth, fully pipelined I/O busses 208. The CPU subsystem 128 includes a pool of general purpose CPUs 202 that provided layer 2 through layer 7 OSI layer packet processing functions. The CPU subsystem 128 also includes packetized I/O interfaces 206 (e.g., Ethernet, SRIO, PCIe) to service the base-station backhaul link 130 as well as any external support devices (disk, wireless LAN). In an exemplary embodiment, the CPU subsystem 128 creates job requests (e.g., job descriptors) and radio data sets in a system memory 204 or in a shared memory 216 and these job requests are scheduled to be processed by the baseband processing subsystem 130.

The CPU subsystem 128 is connected to the baseband processing system 130 over multiple high speed I/O busses 208. Each bus 208 is a shared, full duplex bus allowing simultaneous reads and writes. The CPUs 202 can communicate directly with baseband processing subsystem 130 using memory mapped I/O reads and writes. The baseband processing subsystem 130 can also communicate with the CPU subsystem 128 using coherent memory reads and writes to system memory 204 as well as through programmable interrupts.

The baseband processing subsystem 130 includes a pool of resource blocks comprising either fixed functional elements (FFE) 212 and/or programmable functional elements (PFE) 214 that are used to carry out signal processing tasks required for radio processing. The baseband processing subsystem 130 also includes RF interfaces 218 which interface with at least one radio front end 136 that is coupled to one or more antennas 220.

In an exemplary embodiment, the baseband processing subsystem 130 processes baseband signals to produce modulated transmit signals that are passed through the RF interfaces 218 to the radio front end for transmission by the antennas 220. In another exemplary embodiment, RF signals received by the antennas 220 flow through the radio front end 136 and through the RF interfaces 218 for processing by the baseband processing subsystem 130. Thus, the baseband processing subsystem 130 can provide processing for uplink and downlink communications with a variety of wireless devices while implementing a variety of wireless protocols. The baseband processing subsystem 130 supports several radio back end interfaces 218 which connect the radio front end 136 to the baseband subsystem. For example, these interfaces 218 support both the CPRI (Common Public Radio Interface) and JESD-204B radio interfaces over multiple high speed Serdes (Serial/De-Serial) lanes. Also supported are multiple JESD-207+parallel I/O interfaces.

To execute processing tasks, the baseband processing subsystem 130 includes a flexible job scheduler (PSM) 210 that receives job requests 230 from the CPUs 202 over the bus 208 and queues these job requests until they are processed into one or more scheduled jobs 232 that are sent to the FFE 212 and/or the PFE 214 for completion. Thus, the CPUs 202 are able to implement one or more processing pipelines by generating the appropriate sequence of job requests and sending these sequences of job requests to the baseband processing subsystem 130, which schedules the job requests to be process by the fixed and/or programmable functional elements.

Figure 2B:
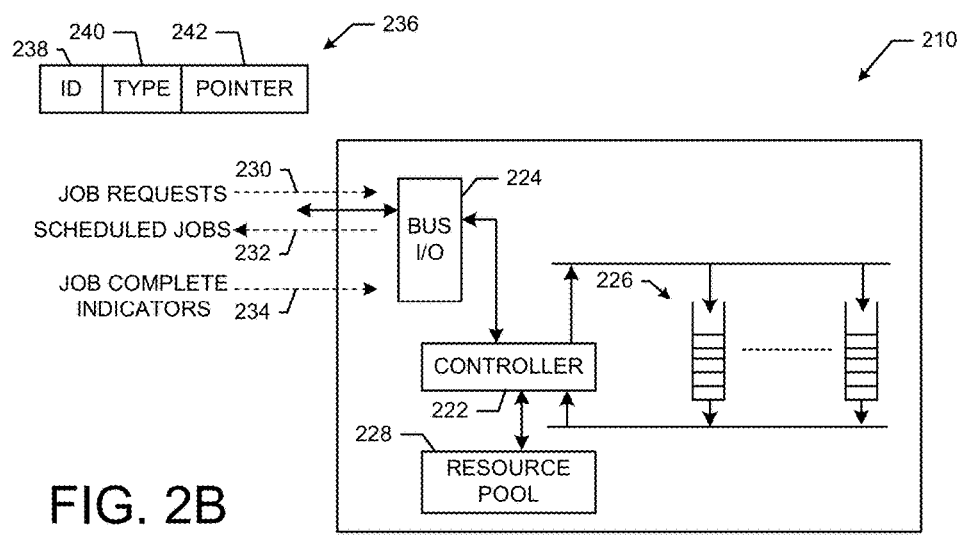
FIG. 2B shows a detailed exemplary embodiment of the job scheduler (PSM) shown in FIG. 2A

FIG. 2B shows a detailed exemplary embodiment of the job scheduler (PSM) 210 shown in FIG. 2A. The PSM 210 comprises a controller 222, bus interface 224, one or more hardware queues 226 and job resource pool 228. The controller 222 receives the job requests 230 on the bus 208 from the CPUs 202 through the bus interface 224 and queues these requests in the hardware queues 226. This dynamic hardware job queueing mechanism is used to service jobs from the same queue in strict order, or to allow jobs from different hardware queues to execute in parallel and out of order giving a high degree of freedom and control for job scheduling of radio timeline events. Jobs from the same queue can also be serialized to delay the launch of the next job until a previous job has completed.

An exemplary job request is illustrated at 236. The job request 236 includes a job identifier 238 that is used to identify the job. The job request 236 also includes a job type 240 that indicates the type of job. The job type can be used to determine which functional elements are capable of performing the job. The job request 236 also includes a pointer 242 that points to a memory location where various parameters associated with the job are stored. For example, the memory pointer 242 may point to a location in the shared memory 216 or a location in the system memory 204.

The PSM 210 maintains a programmable resource pool 228 to assign job types to specific resources (e.g., functional elements). When a pending job reaches the head of a hardware queue, and a functional element is available for the intended job type, the PSM 210 will dispatch the scheduled job to the functional element and track the job to its completion. New job requests can also be initiated by previous job completions or by other external events (e.g., radio frame or delay timer values).

As the jobs exit the queues, the controller 222 routes them (e.g., as scheduled jobs) to the appropriate functional element (e.g., FFE 212 or PFE 214) for completion. In an exemplary embodiment, once an FE completes a job it sends back a corresponding job complete indicator 234. The controller 222 can schedule additional jobs for the functional element in response to receiving the job completion indicator associated with the current job.

Figure 3:
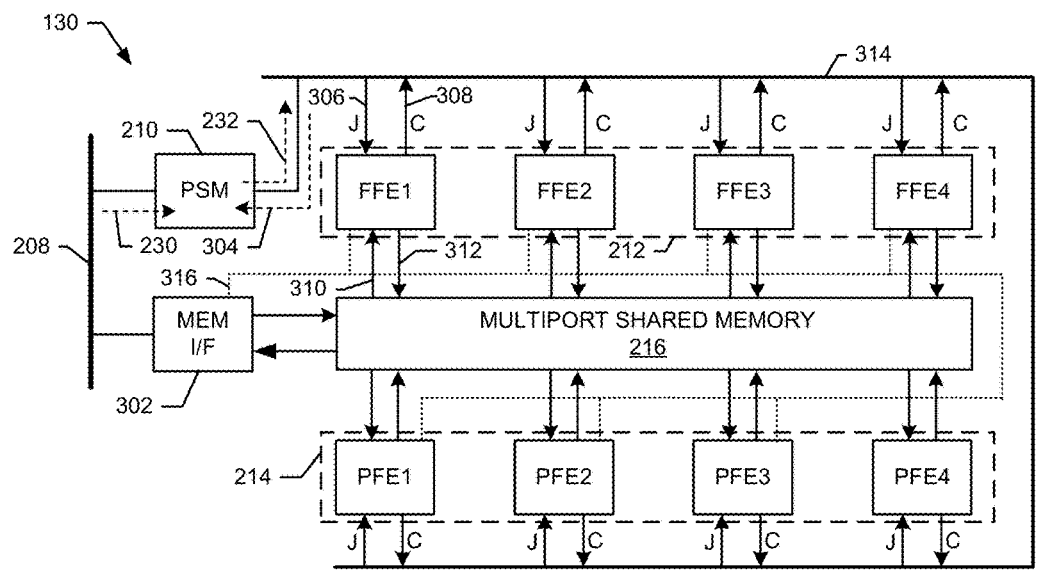
FIG. 3 shows an exemplary detailed embodiment of the baseband processing subsystem shown in FIG. 2A.

FIG. 3 shows an exemplary detailed embodiment of the baseband processing subsystem 130 shown in FIG. 2A. In this embodiment, the FFE resources 212 comprises four FFE resources (e.g., FFE1-FFE4) and the PFE resources 214 comprises four PFE resources (e.g., PFE1-PF4). A memory interface 302 is included that provides memory access to the share memory 216 by the CPU subsystem 128 and/or the PSM 210. The memory interface 302 also provides access to the system memory 204 by the FE resources using bus 316.

Each of the FFE1-4 and PFE1-4 resources includes memory access ports that interface to corresponding ports of the multiport shared memory 216. For example, each of the functional elements can access the shared memory 216 through a dedicated access port. This allows the plurality of FEs to perform simultaneous reads and write of the shared memory 216. In an exemplary embodiment, the shared memory 216 comprises one contiguous memory space that includes a plurality of memory access ports.

During operation, the PSM 210 receives job requests 230 from the CPU subsystem 128. The PSM 210 operates to queue these requests and output schedule job tasks 232 to the FFE1-4 and PFE1-4 resources through a PSM control bus 314. For example, a specific scheduled job request 306 (J) is received by the FFE1. The FFE1 then accesses the memory 216 (as indicated at 310) to obtain the data to be processed. The FFE1, processes the retrieved data and writes processed data back into the memory 216 as indicated at 312. The FFE1 then sends a job complete (C) indicated 308 back to the PSM 210 over the bus 314. Using the above process, a wide variety of jobs can be scheduled to be processed by the FFE1-4 and PFE1-4 resources. For example, in various exemplary embodiments, the FFE and PFE resources can be configured to perform jobs such as encoding, decoding, modulation, demodulation, equalization, estimation, measurement, interleaving, and deinterleaving. For example, uplink or downlink processing pipelines utilizing one or more of the FFE1-4 and/or PFE1-4 resources can be scheduled and completed within a transmission time interval.

Figure 4:
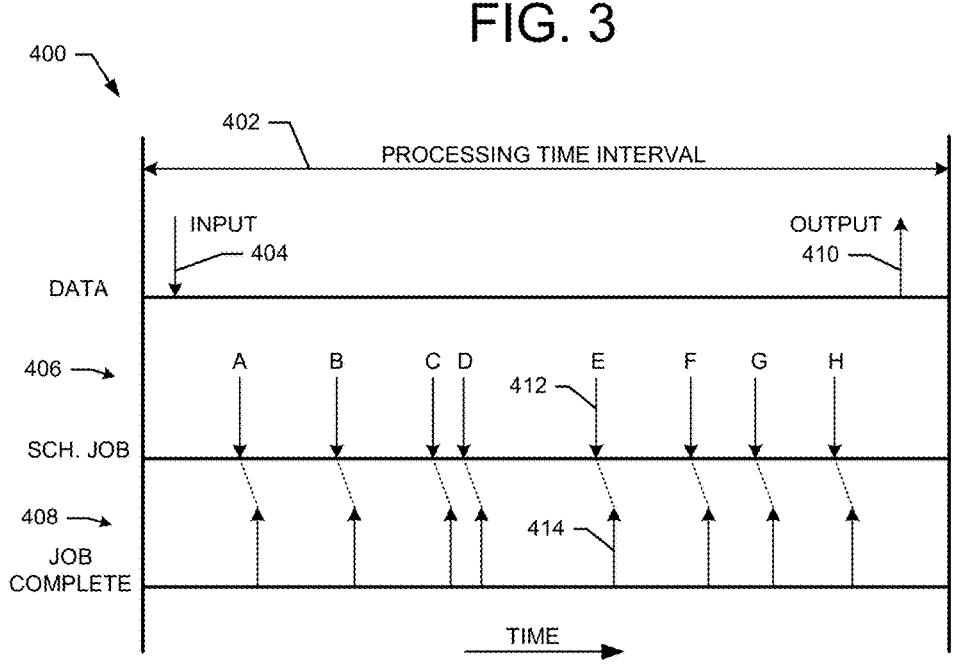
FIG. 4 shows an exemplary embodiment of a timing diagram that illustrates how the PSM schedules jobs to be completed over a processing time interval.

FIG. 4 shows an exemplary embodiment of a timing diagram 400 that illustrates how the PSM 210 schedules jobs to be completed over a processing time interval 402. In an exemplary embodiment, the processing time interval 402 is a transmission time interval (TTI) of a frame or subframe of a wireless communication. However, it should be noted that the processing time interval 402 can be any desired time interval. At the beginning of the processing time interval 402 data is stored into the shared memory 216 as indicated at 404. For example, in one embodiment the data represents baseband data to be prepared for transmission over a wireless communication link. In another embodiment, the data represents received samples of a wireless transmission to be demodulated and decoded.

The PSM 210 outputs scheduled jobs 406 that are used to process the data 404. In this exemplary, the PSM 210 outputs scheduled jobs (A-H) that occur at various time instances within the processing time interval 402. The schedule jobs (A-H) can be performed by any combination of FFE and PFE resources. The jobs (A-H) may process the data independently or in a chained fashion where a particular job may process data resulting from a previously completed job. For each job, the FE that completed the job writes processed data into the shared memory 216 and outputs a corresponding job completion indicator 408. For example, when job (E) 412 completes and processed data is written back into the shared memory 216, the completion indicator 414 is issued. Once all jobs are completed, the resulting processed data is stored in the shared memory 216 and available for output as shown at 410. Thus, the PSM 210 can output scheduled jobs to the FE resources to perform a wide variety of uplink, downlink, encoding, decoding, FFT, IFFT, or any other type of processing functions within the designated processing time interval.

Figure 5A:
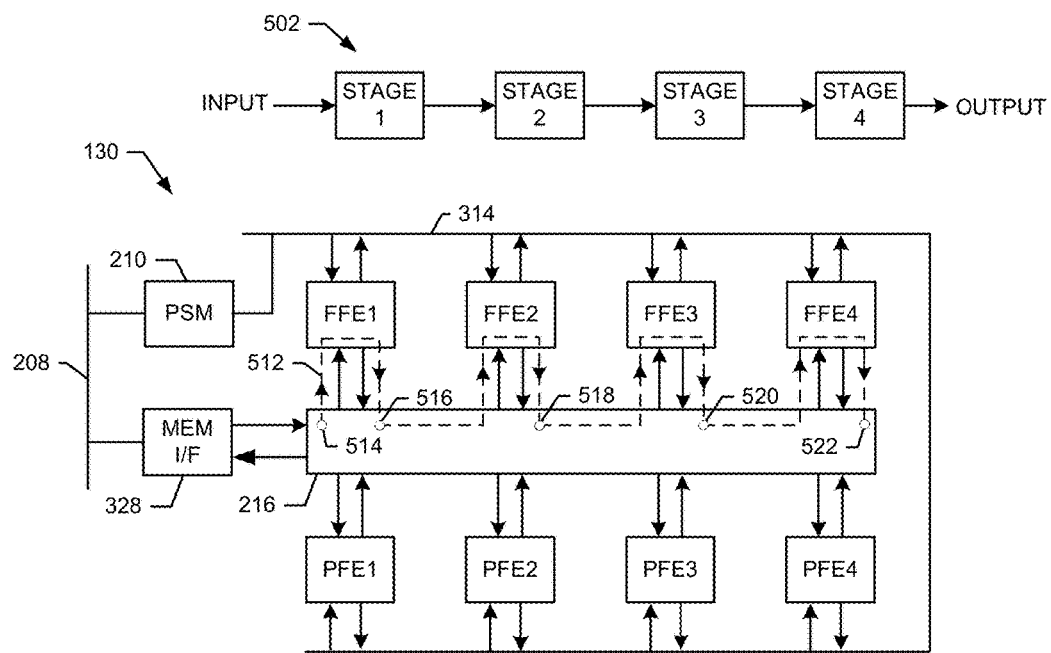
FIG. 5A shows an exemplary embodiment of the baseband processing subsystem that illustrates how stages of a processing pipeline are implemented.

FIG. 5A shows an exemplary embodiment of the baseband processing subsystem 130 that illustrates how stages of a processing pipeline are implemented. For example, four stages of an exemplary processing pipeline are shown at 502. An input is received at Stage 1, which processes the input to generate an output that is passed to Stage 2. The processing continues through the four stages until a final output from Stage 4 is generated.

In an exemplary embodiment, the processing pipeline 502 can be performed by the baseband processing subsystem 130. For example, the PSM 210 receives a sequence of job requests from the CPU 202 that are designed to perform the processing pipeline 502. The PSM 210 then processes the received job request to generate scheduled jobs for FFE1-4 to perform the stages of the processing pipeline 502. For example, the PSM 210 outputs scheduled jobs to FFE1-4 resources through the bus 314 to perform the processing pipeline indicated at 512. The processing pipeline 512 that uses FFE1-4 performs the operations of the Stages 1-4 of the processing pipeline 502. For example, in a first FFE1 reads input data 514 from the shared memory 216, performs Stage 1 processing, and stores the result back into the shared memory 216 as indicated at 516. In a second job, the FFE2 reads the data output of FFE1 at 516 from the shared memory 216, performs Stage 2 processing, and stores the result back into the shared memory 216 as indicated at 518. In a third job, the FFE3 reads the data output of FFE2 at 518 from the shared memory 216, performs Stage 3 processing, and stores the result back into the shared memory 216 as indicated at 520. In a fourth job, the FFE4 reads the data output of FFE3 at 520 from the shared memory 216, performs Stage 4 processing, and stores the result back into the shared memory 216 as indicated at 522, which represents the output of Stage 4 of the processing pipeline 502. Thus, the PSM 210 is able to schedule jobs for the FFE and PFE resources to perform virtually any independent or pipelined process. Although only four jobs have been described, virtually any number of jobs can be scheduled by the PSM 210.

Figure 5B:
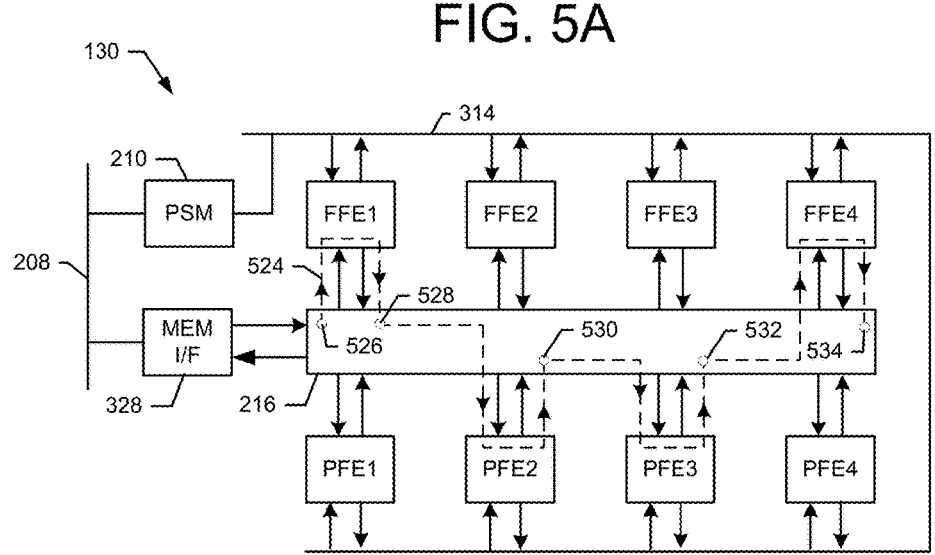
FIG. 5B shows an exemplary embodiment of the baseband processing subsystem that illustrates how stages of a processing pipeline are implemented.

FIG. 5B shows an exemplary embodiment of the baseband processing subsystem 130 that illustrates that illustrates how stages of a processing pipeline are implemented. In an exemplary embodiment, the processing pipeline 502 can be performed by the baseband processing subsystem 130. For example, in response to the sequence of job requests received from the CPU 202, the PSM 210 schedules FFE1, PFE2, PFE3, and FFE4 to perform the stages of the processing pipeline 502. For example, the PSM 210 outputs scheduled jobs to the resources through the bus 314 to perform the processing pipeline indicated at 524. For example, in a first job, FFE1 reads input data 526 from the shared memory 216, performs Stage 1 processing, and stores the result back into the shared memory 216 as indicated at 528. In a second job, the PFE2 reads the data output of FFE1 at 528 from the shared memory 216, performs Stage 2 processing, and stores the result back into the shared memory 216 as indicated at 530. For example, in an exemplary embodiment, the PFE2 is programmed to perform Stage 2 processing. In a third job, the PFE3 reads the data output of PFE2 at 530 from the shared memory 216, performs Stage 3 processing, and stores the result back into the shared memory 216 as indicated at 532. For example, in an exemplary embodiment, the PFE3 is programmed to perform Stage 3 processing. In a fourth job, the FFE4 reads the data output of PFE3 at 532 from the shared memory 216, performs Stage 4 processing, and stores the result back into the shared memory 216 as indicated at 534, which represents the Stage 4 output of the processing pipeline 502. Thus, the PSM 210 is able to schedule jobs for the FFE, and PFE resources to perform virtually any independent or pipelined process. Although only four job have been described, virtually any number of jobs can be scheduled by the PSM 210.

Figure 5C:
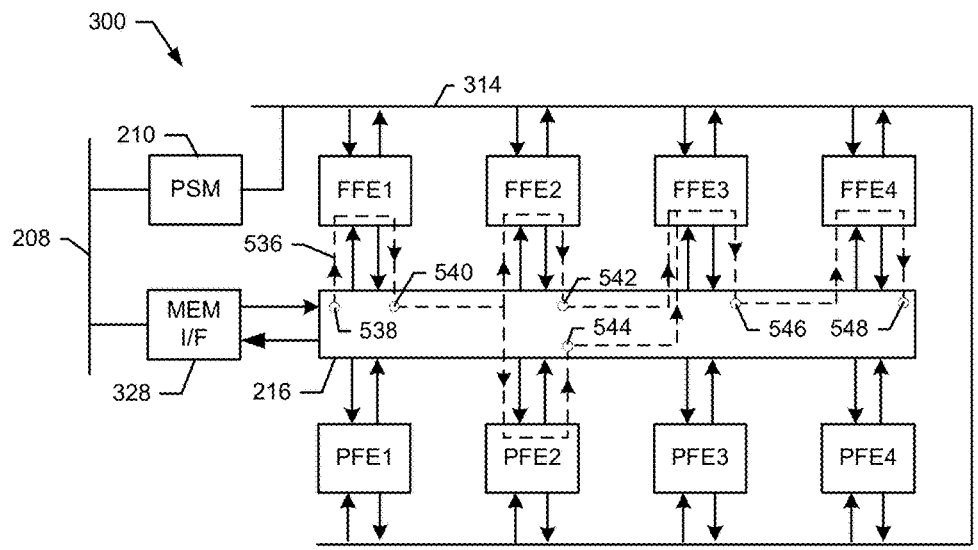
FIG. 5C shows an exemplary embodiment of the baseband processing subsystem that illustrates how stages of a processing pipeline are implemented.

FIG. 5C shows an exemplary embodiment of the baseband processing subsystem 130 that illustrates that illustrates how stages of a processing pipeline are implemented. For example, the baseband processing subsystem shown in FIG. 5C illustrates how parallel processing can be performed. For example, in response to the sequence of job requests received from the CPU 202, the PSM 210 schedules jobs for the FFE1, FFE2, PFE2, FFE3, and FFE4 resources to perform the stages of the processing pipeline 502. For example, the PSM 210 outputs scheduled jobs to the resources through the bus 314 to perform the processing pipeline indicated at 536.

In a first job, FFE1 reads input data 538 from the shared memory 216, performs Stage 1 processing, and stores the result back into the shared memory 216 as indicated at 540. In a second job, the PFE2 reads the data output of FFE1 at 540 from the shared memory 216, performs a first part of Stage 2 processing, and stores the result back into the shared memory 216 as indicated at 544. In a third job that is performed in parallel with the second job, the PFE2 reads the data output of FFE1 at 540 from the shared memory 216, performs a second part of Stage 2 processing, and stores the result back into the shared memory 216 as indicated at 544. In a fourth job, the FFE3 reads the data output of FFE2 at 542 and PFE2 544 from the shared memory 216, performs Stage 3 processing using the two previous results, and stores the result back into the shared memory 216 as indicated at 546.

In a fourth job, the FFE3 reads the data output of FFE3 at 546 from the shared memory 216, performs Stage 4 processing, and stores the result back into the shared memory 216 as indicated at 548, which represents the output of the processing pipeline 502. Thus, the PSM 210 is able to schedule jobs for the FFE and PFE resources to perform parallel processing with the result of one job used as input to two subsequent jobs. Although only five jobs have been described, virtually any number of jobs can be scheduled to operate in a parallel process by the PSM 210.

Figure 5D:
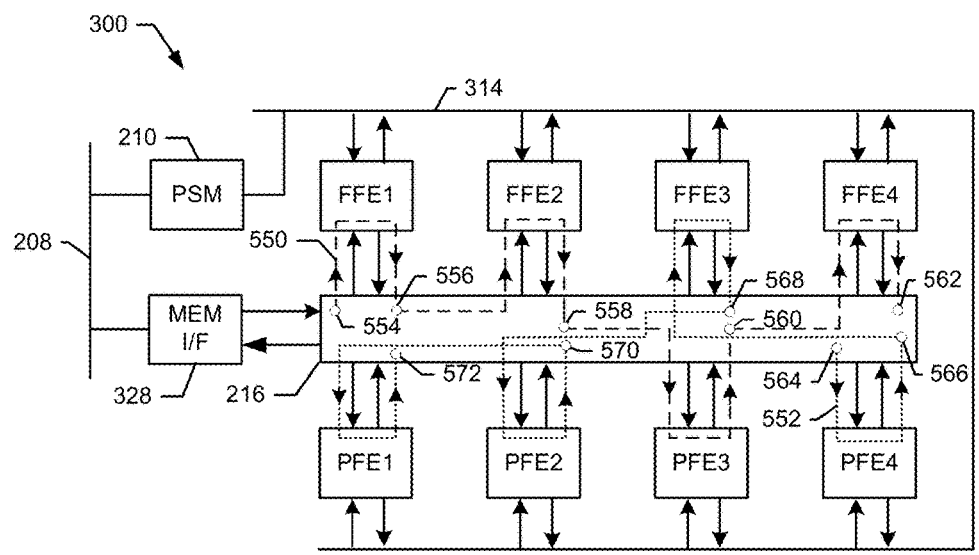
FIG. 5D shows an exemplary embodiment of the baseband processing subsystem that illustrates how two simultaneous processing pipelines are implemented.

FIG. 5D shows an exemplary embodiment of the baseband processing subsystem 130 that illustrates how two simultaneous processing pipelines are implemented. For example, in a first processing pipeline 536, which in an exemplary embodiment can be an uplink process, the PSM 210 schedules jobs for the FFE1, FFE2, PFE3, and FFE4 resources. In a second processing pipeline 552, which in an exemplary embodiment can be a downlink process, the PSM 210 schedules jobs for the PFE4, FFE3, PFE2, and PFE1 resources. For example, the PSM 210 outputs scheduled jobs to the resources through the bus 314 to perform the two processing pipelines 550 and 552.

In an exemplary embodiment, the first processing pipeline 550 includes a first job wherein FFE1 reads input data 554 from the shared memory 216, performs processing, and stores the result back into the shared memory 216 as indicated at 556. In a second job of the first processing pipeline 550, FFE2 reads the data output of FFE1 at 556 from the shared memory 216, performs processing, and stores the result back into the shared memory 216 as indicated at 558. In a third job of the first processing pipeline 550, PFE3 reads the data output of FFE2 at 558 from the shared memory 216, performs processing, and stores the result back into the shared memory 216 as indicated at 560. In a fourth job of the first processing pipeline 550, the FFE4 reads the data output of PFE3 at 560 from the shared memory 216, performs processing, and stores the result back into the shared memory 216 as indicated at 562.

In an exemplary embodiment, the second processing pipeline 552 includes a first job wherein PFE4 reads input data 564 from the shared memory 216, performs processing, and stores the result back into the shared memory 216 as indicated at 566. In a second job of the second processing pipeline 552, FFE3 reads the data output of PFE4 at 566 from the shared memory 216, performs processing, and stores the result back into the shared memory 216 as indicated at 568. In a third job of the second processing pipeline 552, PFE2 reads the data output of FFE3 at 568 from the shared memory 216, performs processing, and stores the result back into the shared memory 216 as indicated at 570. In a fourth job of the second processing pipeline 552, the PFE1 reads the data output of PFE2 at 570 from the shared memory 216, performs processing, and stores the result back into the shared memory 216 as indicated at 572.

Thus, the PSM 210 is able to schedule jobs for the FFE and PFE resources to perform two processing pipelines simultaneously. Although only two processing pipelines have been illustrated and described, virtually any number of processing pipelines can be scheduled by the PSM 210.

Figure 6:
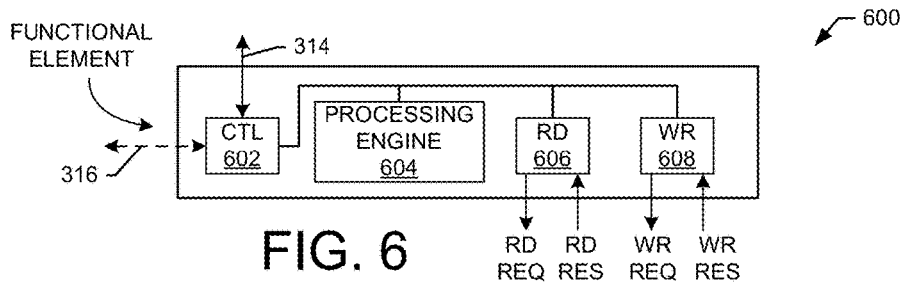
FIG. 6 shows an exemplary embodiment of a functional element for use with the baseband processing subsystem.

FIG. 6 shows an exemplary embodiment of a functional element (FE) 600 for use with the baseband processing subsystem 130. In an exemplary embodiment, the FE 600 comprises a controller 602, engine 604, memory read interface 606, and memory write interface 608.

In an exemplary embodiment, the functional element 600 is configured as a fixed functional element (FFE) when the engine 604 is configured to perform fixed function (hard-wired) algorithms that do not change and provide minimal area overhead and low power solutions for a variety of fixed functions, such as FFT, Turbo decoder, and/or any other types of fixed functions. For example, in this embodiment, the engine 604 comprises any suitable hardware, firmware, state machine, logic array, and/or discrete components to perform a fixed function indicated by a received scheduled job.

In an exemplary embodiment, the functional element 600 is configured as a programmable functional element (PFE) when the engine 604 is configured to perform programmable processing functions. For example, the PFE can be implemented using a DSP core, FPGA, programmable Fabric, and/or a micro-coded engine or application-specific processor (ASP). In this exemplary embodiment, the PFE 604 comprises a programmable DSP processor with dedicated instruction and data memory to be used for soft-wired algorithms that require more sophisticated digital signal processing and can be changed with each new or evolving radio protocol.

The controller 602 comprises any suitable processor, hardware, firmware, state machine, logic array, and/or discrete components to allow the FE 600 to communicate with a job scheduler (e.g., the job schedule 210 shown in FIG. 3). For example, in an exemplary embodiment, the controller 602 communicates with the job scheduler 210 using bus 314. The controller 602 receives scheduled jobs and enables the engine 604 and memory interfaces 606 and 608 to perform the required data processing. The controller 602 is also coupled to the bus 316 to allow the controller to communicate with the memory interface 302 and other entities coupled to that interface.

The memory read interface 606 comprises any suitable processor, hardware, firmware, and/or discrete components to allow memory access to a shared memory (e.g., the shared memory 216 shown in FIG. 3). For example, in an exemplary embodiment, the memory read interface 606 interfaces with the shared memory using read request and read response signals to perform memory reads. In an exemplary embodiment, the memory read interface 606 performs direct memory access (DMA) to the shared memory 216.

The memory write interface 608 comprises any suitable processor, hardware, firmware, and/or discrete components to allow memory access to a shared memory (e.g., the shared memory 216 shown in FIG. 3). For example, in an exemplary embodiment, the memory write interface 606 interfaces with the shared memory using write request and write response signals to perform memory writes. In an exemplary embodiment, the memory write interface 608 performs direct memory access (DMA) to the shared memory 216.

During operation, the controller 602 receives scheduled job requests through the bus 314 and controls the engine 604 to perform the processing function indicated in the receive scheduled job request. The engine 604 utilizes the read and write interfaces 606 and 608 to read and write data to the shared memory as necessary to complete the job. In an exemplary embodiment, the controller 602 may access other resources through the bus 316. For example, the controller 602 may access the system memory 204 to read/write data, parameters, configuration information and/or other information that may be used during operation of the FE 600. Upon completion of the scheduled job, the controller 602 sends a job complete indicator back to the scheduler 210 using the bus 314.

Thus, the functional element 600 receives scheduled jobs, obtains data from the shared memory, processes the data using either a fixed or programmable processor, and then writes the processed data back into the shared memory. The controller 602 also sends out a corresponding job completion indicator as each job is completed.

Figure 7:
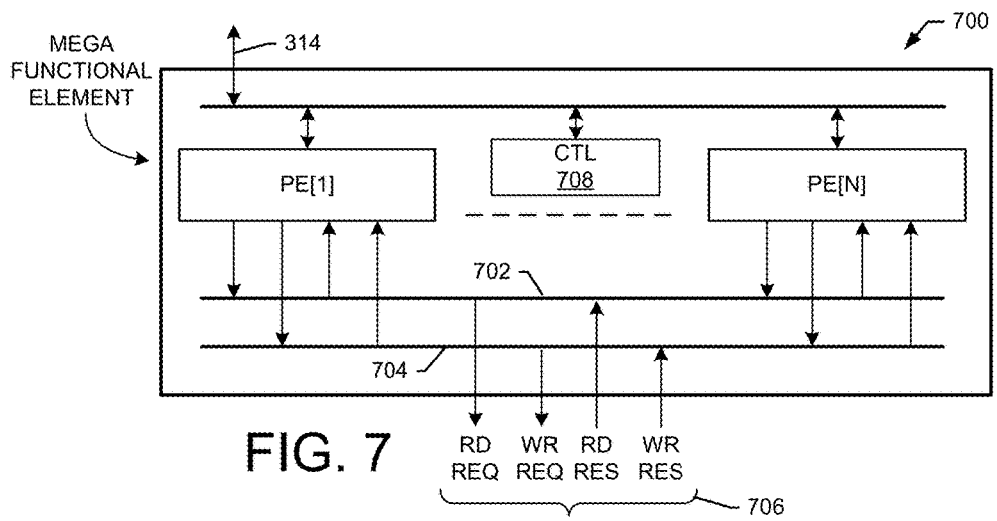
FIG. 7 shows an exemplary embodiment of a mega functional element (MFE) for use with the baseband processing subsystem.

FIG. 7 shows an exemplary embodiment of a mega functional element (MFE) 700 for use with the baseband processing subsystem 130. In an exemplary embodiment, the MFE 700 comprises one controller and a plurality of processing engines (PE). For example, as illustrated in FIG. 7, the MFE 700 comprises controller 708 and a total of (N) PEs. If the MFE 700 comprises fixed processing engines then the MFE 700 forms a mega FFE (MFFE) that can be used as part of the FFE resources 212 shown in FIG. 2A. If the MFE 700 comprises programmable processing engines, then the MFE 700 forms a mega PFE (MPFE) that can be used as part of the PFE resources 214 shown in FIG. 2A.

In an exemplary embodiment, the MFE 700 also includes a memory read bus 702 that carries memory read requests (REQ) and memory read responses (RES) and a memory write bus 704 that carries memory write requests and memory write responses that allow the plurality of PE resources in the MFE 700 to access the share memory 216 through memory interface 706.

In an exemplary embodiment, the multiple PE resources inside the MFE 700 operate on separate jobs independently and multiple PE resources can be active simultaneously while working on different jobs to provide better overall throughput. The PSM 210 is aware of the number of PE resources within the MFE 700 and will dispatch and use all or a portion of the available PE resources when dispatching new jobs for the MFE 700.

Figure 8:
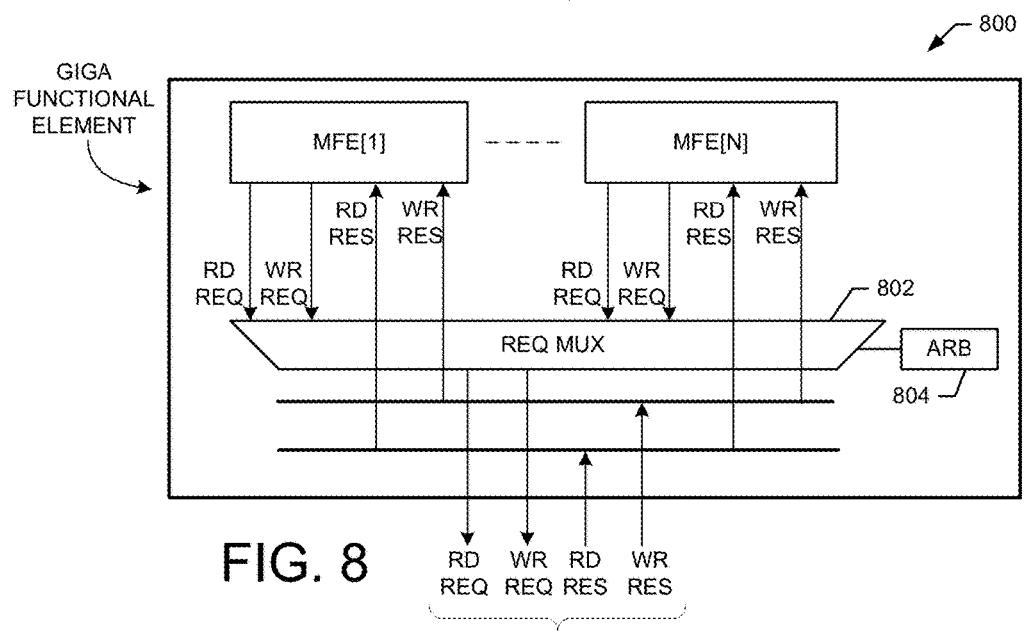
FIG. 8 shows an exemplary embodiment of a giga functional element (GFE) for use with the baseband processing subsystem.

FIG. 8 shows an exemplary embodiment of a giga functional element (GFE) 800 for use with the baseband processing subsystem 130. In an exemplary embodiment, the GFE 800 comprises a plurality of MFE resources. For example, as illustrated in FIG. 8, the GFE 800 comprises (N) MFE resources. If the GFE 800 comprises MFFE resources then the GFE 800 forms a giga FFE (GFFE) resource. If the GFE 800 comprises MPFE resources, then the GFE 800 forms a giga PFE (GPFE) resource. In an exemplary embodiment, the GFFE resources can be used as part of the FFE resources 212 and the GPFE resources can be used as part of the PFE resources 214 shown in FIG. 2A.

The GFE 800 arrangement operates to minimize the memory interconnects required for the MFFE and MPFE resources to gain access to a common/shared memory (SMEM). The GFFE (or GPFE) grouping is carefully chosen based on each MFFE's function and timeline as well as memory bandwidth requirements. In an exemplary embodiment, the MFEs can be grouped into their corresponding GFE partitions to best load balance their memory bandwidth requirements during the processing time interval.

GFE Arbitration

In various exemplary embodiments, FEs are grouped into GFEs to reduce the value N in a [N+1×M+1] crossbar switch (e.g., switches 902 and 904 illustrated in FIG. 9) to reduce power/area and complexity. It is also desirable to have flexible GFE arbitration to allow weighted round robin (RR) arbitration to provide guaranteed bandwidth for each FE behind a particular GFE. Thus, the GFE arbitration is easy to implement and arbitration priorities can be changed to give some FE's more bandwidth than others behind the same GFE if desired.

In an exemplary embodiment, for the MFFEs or MPFEs within a single GFFE or GPFE, a programmable weighted round robin with priority arbitration scheme is employed to guarantee memory bandwidth amongst the multiple mega resources within the giga cluster. In another exemplary embodiment, the GFE provides a single agent with highest priority to ensure low and predictable data transfer latencies. For example, the GFE 800 comprises a memory request multiplexer 802 and a bus arbitrator 804. In an exemplary embodiment, the memory request multiplexer 802 multiplexes the memory requests from the MFE resources to the shared memory and the arbitrator 804 performs an arbitration function to determine which requests are processed. For example, the arbitrator 804 performs the programmable weighted round robin with priority arbitration scheme to determine which resource is granted memory access.

In an exemplary embodiment, each GFFE or GPFE includes a memory port that allows access to either the shared multiport memory (e.g., memory 216) or the CPU subsystem's larger system memory (e.g., memory 204). Partially processed results from one MFFE (or MPFE) can be temporarily stored in shared memory 216 (or the system memory 204) to be used later by other MFFE or MPFE resources.

In an exemplary embodiment, each GFFE or GPGE includes a memory port that has multiple R/W ports into the shared memory 216, so that simultaneous read(s) and write(s) can be issued to the shared memory 216 to maximize memory bandwidth. For example, in one embodiment, three MFFE resources are grouped into the same GFFE, which allows one 128-bit read and one 128-bit write to be launched simultaneously over the GFFE memory port.

Figure 9:
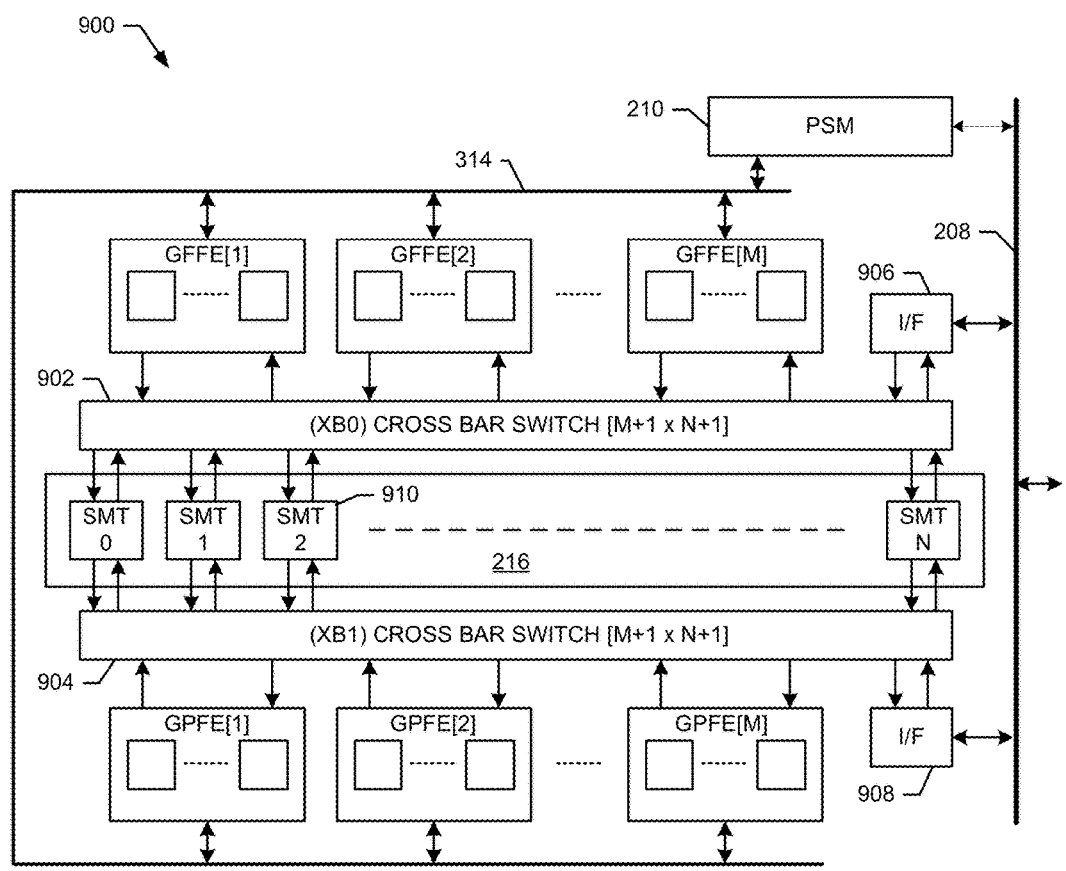
FIG. 9 shows an exemplary embodiment of a baseband processing subsystem comprising giga functional elements and cross bar switches.

FIG. 9 shows an exemplary embodiment of a baseband processing subsystem 900 comprising giga fixed functional elements (GFFE) and giga programmable functional elements (GPFE). In an exemplary embodiment, the shared multiport memory 216 comprises N shared memory tiles (SMT), such as SMT 910. The subsystem 900 comprises two fully buffered [m+1(source)×n+1(destination)] crossbar switches 902 and 904. Each crossbar switch allows full connectivity between 'm' GFFE (or GPFE) resources to any 'm' SMT destinations. The additional "+1" source port provides the CPU subsystem access to the shared memory (SMEM) 912 using interface 906. Likewise, the additional "+1" destination port allows each GFFE (or GPFE) access to the CPU system memory 204 using interface 908. In an exemplary embodiment, the interfaces 906 and 908 form the interface 302 shown in FIG. 3. These accesses are done over the bus 208 (a high bandwidth I/O bus that connects the CPU and baseband subsystems.

In an exemplary embodiment, each crossbar switch is fully buffered in that it includes (depth=k) request & response FIFOs for every request source to response destination pair (e.g., at every crossbar point). The k-depth

[src-dst] cross point FIFOs are used to cover the k-cycle SMEM request plus response latencies, so that each GFFE can issue multiple outstanding memory transactions to keep any source to destination pair fully pipelined. In this manner, any GFFE[x] to SMEM 216 data stream can issue 'k' outstanding transactions that are in-flight simultaneously, and can fully saturate its read (or write) port bandwidth.

In the exemplary embodiment shown in FIG. 9, there are two crossbar switches. In an exemplary embodiment, the crossbar (XB0) 902 connects m=6 GFFE+1 CPU source ports to n=8 SMEM Tiles (SMT)+1 SysMem port using a [7×9] crossbar switch. Likewise, the second crossbar (XB1) 904 connects m=6 GPFE+1 CPU source port to n=8 SMEM Tiles (SMT)+1 SysMem port using [7×9] crossbar switch. Each one of the eight (8) distributed SMT memories has two memory port connections into the two crossbar switches (XB0/XB1) (e.g., total four ports) capable of issuing up to 16 read+16 write=32 (max) SMEM transactions per cycle.

The dual crossbar distributed SMEM architecture with bank aware memory controllers can achieve extremely high SMEM memory bandwidth with very low and predictable latencies and is well suited for radio baseband processing in base station environments to support a large number of users and antenna configurations.

Figure 10:
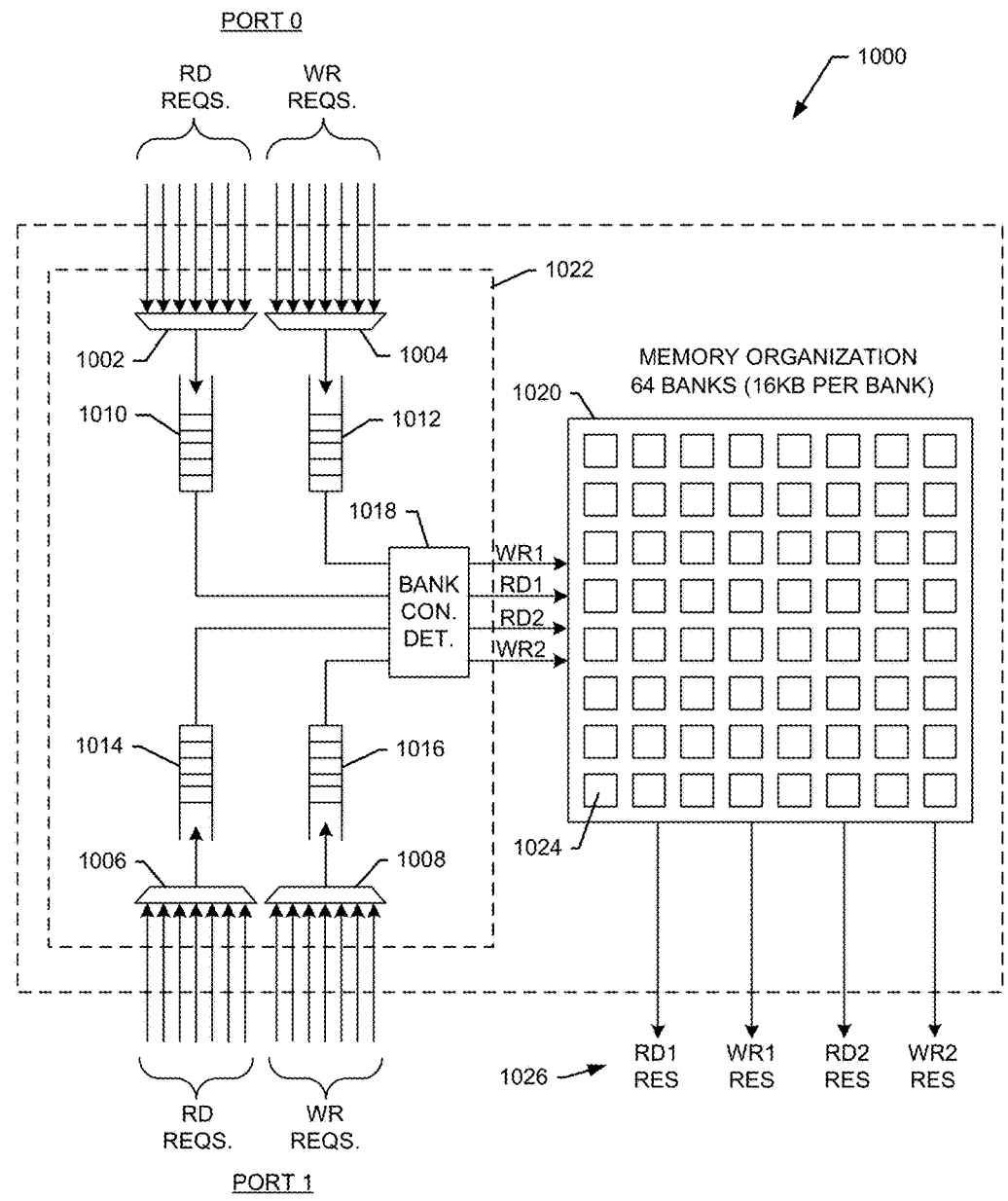
FIG. 10 shows an exemplary embodiment of a shared multiport memory for use with the baseband subsystem.

FIG. 10 shows an exemplary embodiment of a shared memory tile 1000 for use with the baseband subsystem 130. For example, the SMT 1000 is suitable for use as the SMT 910 shown in FIG. 9. The SMT 1000 comprises a memory 1020 and a memory controller 1022. In one embodiment, the memory 1020 comprises 64 banks (e.g., bank 1024) with each bank providing 16 KB of storage. However, other memory configuration are possible. The memory controller 1022 includes two ports (PORT0 and PORT1) and each port receives read and write requests that are coupled to one of the input selectors 1002, 1004, 1006, and 1008. The output of each selector is input to a queue, such as queues 1010, 1012, 1014, and 1016. The queues are coupled to a bank conflict (CON) detector 1018, which resolves memory access conflicts.

During operation, read and write requests are received at the two ports. These requests flow through the corresponding input queues to the conflict detector 1018. The conflict detector 1018 resolve memory bank access conflicts between the requests output from the queues. For example, after bank conflicts are resolved, two memory read requests and two memory write requests are allowed to flow to the banks of the memory 1020 simultaneously. In response to the RD and WR requests, the memory 1020 outputs two RD and WR responses (res) as indicated at 1026.

In an exemplary embodiment, multiple GFE partitions (each containing multiple MFEs) can gain parallel access to the SMEM 216 using multiple fully buffered crossbar switches 902 and 904. To maximize memory bandwidth, the large shared memory (SMEM) 216 is distributed across "N" shared memory tiles (SMT), such as SMT 1000. Each SMT contains multiple memory ports connected into the crossbar, where each memory port can accept multiple concurrent transactions, such that "n" simultaneous multi-ported memory transactions can be active on the crossbar switch. This allows "M" GFEs to access up to "N" shared SMEM tiles over the [m+1×n+1] crossbar switch in parallel. For example, MFE[x] in GFE[0] can make memory requests into SMT[0] at the same time that MFE[y] in GFE[1] is making requests into SMT[1].

In an exemplary embodiment, an 8 MB SMEM 216 is distributed across n=8 1 MB SMEM tiles (SMT). Each SMT contains two memory ports, where each memory port has one read plus one write port (full duplex). Thus, across two memory ports the SMT can service up to 4 total memory transactions per cycle. In the embodiment shown, each SMT is constructed using 64 physical banks, using area efficient single-ported RAMs with bank-aware memory controllers that allow up to 4 memory transactions across 4 logical ports per-cycle as long as transactions are to different banks.

Figures 11, 12:
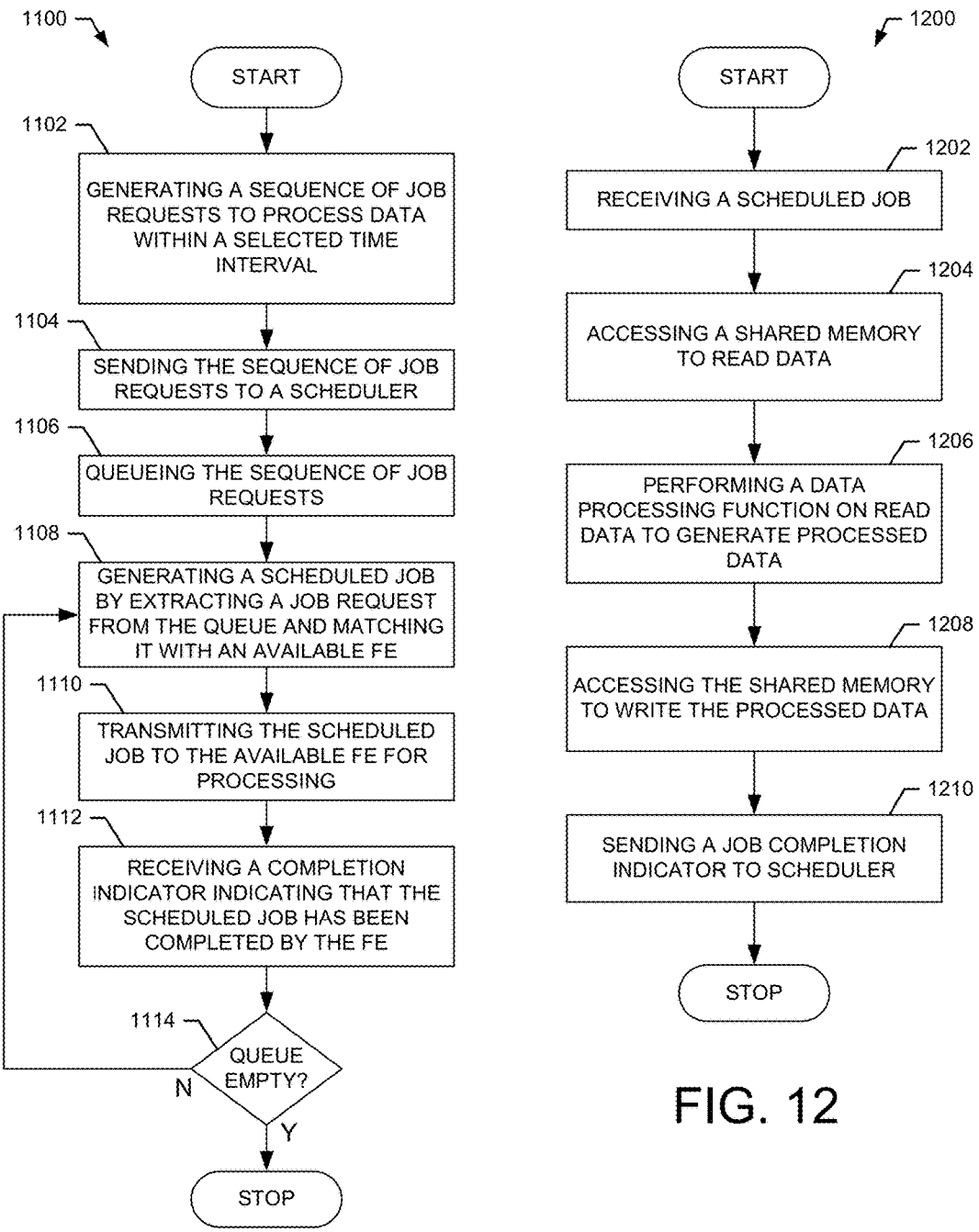
FIG. 11 shows an exemplary embodiment of a method for operating a unified baseband architecture in accordance with one embodiment of the present invention.
FIG. 12 shows an exemplary embodiment of a method for operating a functional element in accordance with one embodiment of the present invention.

FIG. 11 shows an exemplary embodiment of a method 1100 for operating a unified baseband architecture in accordance with one embodiment of the present invention. For example, the method is suitable for use with the baseband architecture shown in FIG. 2A to process a sequence of job requests. For example, in an exemplary embodiment, the sequence of job requests form a processing pipeline.

At block 1102, a sequence of job requests is generated to process data within a transmission time interval. For example, the sequence of job requests process uplink or downlink data in a wireless communication system. In one example, the sequence of job requests form the processing pipeline 502 shown in FIG. 5A. In an exemplary embodiment, the CPUs 202 shown in FIG. 2A operate to generate the sequence of job requests to process data within the transmission time interval.

At block 1104, the sequence of job requests is sent to a scheduler of a baseband processing subsystem. For example, the CPUs 202 send the sequence of job requests 230 to the scheduler 210 using the bus 208.

At block 1106, the sequence of job requests is queued. In an exemplary embodiment, the scheduler 210 receives the sequence of job requests 230 and queues them in its internal queues 226.

At block 1108, scheduled jobs are generated by extracting job requests from the queue and matching the job requests with available FEs. For example, in an exemplary embodiment, the job requests are constructed as illustrated at 236 to comprise an identifier 238, job type indicator 240 and memory pointer 242. The controller 222 extracts a job request from the queue 226 and matches the type indicator 240 with an available FE that is capable of performing that processing function. For example, the controller 222 can access the resource pool 228 to determine which FEs are available and capable of performing the particular processing function required by the job. Once the controller 222 determines an available FE to perform the required processing, the job is scheduled for that FE to complete.

At block 1110, the scheduled job is sent to the available FE for processing. For example, the scheduler 210 sends the scheduled job request to the FE using the bus 314. In an exemplary embodiment, the format of the scheduled job is the same as the received job request.

At block 1112, a job completion indicator is received after the scheduled job as been completed by the designated FE. In an exemplary embodiment, the job is processed by the FE according to the method 1200 shown in FIG. 12. After the job is completed, the designated FE sends a job completion indicator 304 to the scheduler 210 to indicate the job has been completed. Thus, the result of the job is now stored in the shared memory 216.

At block 1114, a determination is made as to whether there are any more jobs to be performed. For example, if there are more jobs in the queue 226 to be performed, the method proceeds to block 1108. If there are no jobs in the queue, then the method ends. In an exemplary embodiment, the sequence of jobs received by the scheduler 210 form the processing pipeline 502. In this embodiment, the jobs of the processing pipeline are performed in sequence such that as each job is completed, the result is stored in the shared memory allowing a subsequent job to retrieve the result and perform additional processing to generate a next result in the pipeline, which is then stored in the shared memory. This process continues until the entire sequence of jobs is processed. For example, the sequence of jobs is processed according to processing pipeline 512 shown in FIG. 5A.

Thus, the method 1100 operates to process a sequence of job requests in a unified baseband architecture in accordance with one embodiment of the present invention. It will be apparent to one with skill in the art that the operations of the method 1100 can be reordered, modified, added to, or deleted within the scope of the embodiments. It should be noted that the sequence of jobs can represent any type of individual process or processing pipeline, for example, an uplink or downlink process for use in a wireless communication system. Although the method 1100 describes the processing of one job sequence, any number of job sequences may be processed in the same or similar manner.

FIG. 12 shows an exemplary embodiment of a method for operating a unified baseband architecture in accordance with one embodiment of the present invention.

At block 1202, a scheduled job request is received at a functional element. For example, in an exemplary embodiment, the scheduled job 306 is received at the FFE1 shown in FIG. 3. The received scheduled job may be part of a sequence of jobs forming a processing pipeline.

At block 1204, a shared memory is accessed to read data. For example, in an exemplary embodiment, the shared memory 216 is accessed as indicated at 310 to read data to be processed.

At block 1206, the data is processed to generate processed data. In an exemplary embodiment, the FFE1 processes the data using a selected fixed function to generate the processed data. In another embodiment, the data may be read and processed by PFE1 using a selected programmable process.

At block 1208, the processed data is written back to shared memory. For example, in an exemplary embodiment, the processed data is written to the shared memory 216 by the FFE1 as shown at 312.

At block 1210, a job completion indicator is sent to a scheduler. In an exemplary embodiment, the FFE1 sends the job completion indicator 308 to the scheduler 210 using the bus 314.

Thus, the method 1200 operates to process a scheduled job at a functional element in accordance with one embodiment of the present invention. It will be apparent to one with skill in the art that the operations of the method 1200 can be reordered, modified, added to, or deleted within the scope of the embodiments. It should be noted that the functional element (FE) described in the method 1200 can be part of the FFE 212 or PFE 214. For example, the FE may be part of the GFEs shown in FIG. 9 and may access shared memory tiles through a crossbar switch as shown in FIGS. 9-10.

While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An apparatus, comprising:
a shared memory having a host access port and a plurality of access ports;
a scheduler that outputs scheduled jobs, wherein each scheduled job identifies data processing to be performed; and
a plurality of functional elements (FEs) coupled to the plurality of access ports, respectively, to access the shared memory, wherein each functional element is operable to retrieve selected data from the shared memory, process the selected data to generate processed data, and store the processed data into the shared memory based on a received scheduled job, wherein the plurality of functional elements is grouped into one or more giga functional elements (GFEs), and wherein each GFE includes bus arbitration to provide each FE with a corresponding amount of bandwidth.

2. The apparatus of claim 1, wherein the plurality of functional elements are coupled to a system memory, and wherein each functional element is operable to retrieve the selected data from the system memory, process the selected data to generate processed data, and store the processed data into the system memory based on the received scheduled job.

3. The apparatus of claim 1, wherein the scheduler generates the scheduled jobs from job requests received from a central processor.

4. The apparatus of claim 1, wherein the functional elements include fixed functional elements (FFE) and programmable function elements (PFE).

5. The apparatus of claim 4, wherein a group of scheduled jobs form a processing pipeline that utilizes a selected combination and a selected order of the FFE and the PFE.

6. The apparatus of claim 5, wherein any selected FFE utilized in the processing pipeline can be substituted with a selected PFE.

7. The apparatus of claim 5, wherein the functional elements of the processing pipeline process data sequentially or in parallel based on the group of scheduled jobs.

8. The apparatus of claim 1, further comprising at least one cross bar switch coupled between the giga functional elements and the shared memory, wherein the at least one cross bar switch provides simultaneous access to the shared memory.

9. The apparatus of claim 1, wherein the shared memory comprises a plurality of shared memory tiles, and wherein each shared memory tile includes a memory controller that supports a plurality of logical ports.

10. The apparatus of claim 9, wherein each shared memory tile comprises a plurality of physical memory banks.

11. The apparatus of claim 10, wherein a total number of the physical memory banks is equal to or greater than a total number of the logical ports.

12. A method, comprising:
generating a sequence of job requests to process data;
matching the job requests with a plurality of functional elements to generate scheduled jobs, wherein each functional element is connected to a respective access port of a shared memory; and
sending each scheduled job to its matching functional element for processing, wherein the scheduled jobs are processed in one of serial processing, parallel processing, or a combination of serial and parallel processing; and
grouping the plurality of functional elements into one or more giga functional elements (GFEs) which includes bus arbitration to provide each functional element with a corresponding amount of bandwidth.

13. The method of claim 12, wherein the sequence of jobs are generated to process the data within a transmission time interval.

14. The method of claim 12, further comprising receiving completion indicators from the functional elements when their corresponding jobs are completed.

15. The method of claim 12, further comprising queueing the sequence of job requests.

16. A method, comprising:
- receiving a plurality of scheduled jobs at a plurality of functional elements, wherein each functional element is connected to a respective access port of a shared memory;
- reading data from the shared memory, wherein the reading is performed by the plurality of functional elements using their respective access port;
- processing the data to generate processed data, wherein each functional element processes the data it has read from the shared memory based on a scheduled job it has received;
- writing the processed data to the shared memory, wherein each functional element writes the processed data it has generated to the shared memory using its respective access port; and
- grouping the plurality of functional elements into one or more giga functional elements (GFEs) which includes bus arbitration to provide each functional element with a corresponding amount of bandwidth.

17. The method of claim 16, further comprising sending a job completion indicator from each functional element after it completes its associated scheduled job.

18. The method of claim 16, wherein the plurality of functional elements perform the processing in one of serial processing, parallel processing, or a combination of serial and parallel processing.

19. The method of claim 16, wherein the plurality of scheduled jobs form a processing pipeline to process the data within a transmission time interval.

* * * * *